No. 735,087. PATENTED AUG. 4, 1903.
C. GLOVER.
COASTER BRAKE.
APPLICATION FILED FEB. 19, 1903.
NO MODEL.
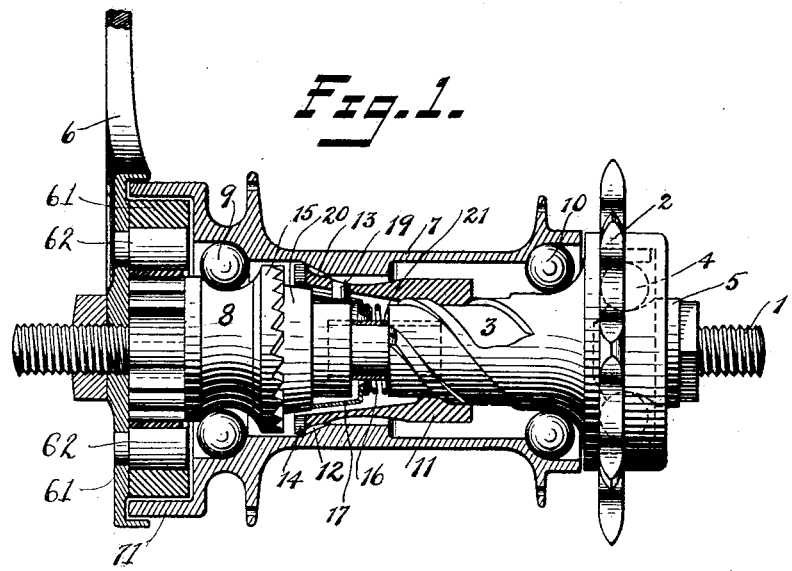
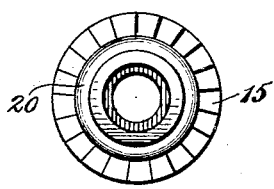
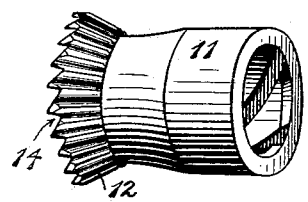
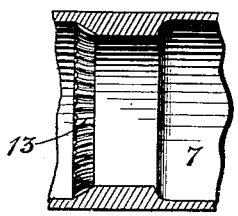
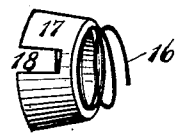
WITNESSES:
Geo. V. Rasmussen
INVENTOR
Charles Glover
BY
R. C. Mitchell
ATTORNEY No. 735,087. Patented August 4, 1903.

UNITED STATES PATENT OFFICE.

CHARLES GLOVER, OF NEW BRITAIN, CONNECTICUT.

COASTER-BRAKE.

SPECIFICATION forming part of Letters Patent No. 735,087, dated August 4, 1903.

Application filed February 19, 1903. Serial No. 144,069. (No model.)

*To all whom it may concern:*

Be it known that I, CHARLES GLOVER, a citizen of the United States, residing at New Britain, in the county of Hartford, State of Connecticut, have invented certain new and useful Improvements in Coaster-Brakes, of which the following is a full, clear, and exact description.

My invention relates to improvements in coaster-brakes.

The object of this invention is to improve the construction of a brake of this general character so that the driving parts may be coupled directly with the driving-wheel or hub when rotating in a forward direction, so that the hub may rotate freely under its own momentum when the driving power is removed and so that a brake may be applied directly to resist the rotation of the hub by reversing the driver. Incidentally the construction by means of which this is effected will be found simple and of few parts, so that it results in an economical article of manufacture and in reliable and satisfactory operation. The details will be more clearly seen on inspection of the accompanying drawings, in which—

Figure 1 is a longitudinal cross-section and elevation of a device embodying the improvements of my invention. Fig. 2 is an end view of details constituting the brake-actuator. Fig. 3 is a perspective view of a collar which serves to couple the driving mechanism with the hub or with the brake-actuator when in operation as desired. Fig. 4 is a longitudinal cross-section showing the interior of a fragment of the hub. Fig. 5 is a perspective view of a detail which assists in holding the parts in their proper position when coasting.

1 is a stationary axle.

2 is a driver having a cam extension 3, which I will term the "driver extension." The driver and extension are rotatably mounted upon the axle 1 and have a series of antifriction-bearings 4 coacting with a cone 5.

6 is a stationary bracket. 62 62 are studs thereon.

61 61 are brake-shoes held by the studs, but free to be moved outward by the means of a brake-actuator 8, hereinafter referred to. The brake-shoes engage with the hub or a flange 71 thereon, so as to retard or check the rotation thereof when desired. It should be understood that the particular location and construction of the brake mechanism proper is immaterial to this invention. As to the particular form of brake mechanism shown in the drawings it is shown and described in detail in my former patent, No. 691,541, and need not, therefore, be more fully referred to herein.

7 is a wheel-hub.

8 is what may be termed the "brake-actuator," which coacts with brake mechanism at the left to throw it into engagement with the hub or a part of the hub to retard or check the same when desired.

9 and 10 are balls of series forming bearings for the ends of the hub.

11 is a collar by means of which the driver may be coupled either with the hub 7 or the brake-actuator 8. This collar is provided on the interior with a threaded portion to correspond with the cam-threads on the driver extension 3, and it is further provided with a series of teeth 12, facing toward the right and lying in substantially the frustum of a cone. The hub 7 is provided with a correspondingly-formed annular set of teeth with which the teeth 12 of the collar 11 engage when the driver is rotated in a forward direction. On inspection of Fig. 1 it will be noted that the forward rotation of the driver 2 will cause the extension 3 to draw the collar 11 to the right, and thus hold the teeth 12 of said collar in engagement with the teeth 13 of the hub 7. At this time the parts rotate on the antifriction-bearings 9 and 4. It should be understood that the shape, taper, size, and location of the teeth 12 13 may be varied from that shown in the drawings without departing from my invention. On the left end of the collar 11 is a series of teeth 14, corresponding to the teeth 15 on the brake-actuator 8. These teeth are in the form of a crown-ratchet and are brought into engagement with one another when the direction of rotation of the driver is reversed, for the cam of the driver extension 3 will at this time force the sleeve 11 to the left, first freeing the same from the hub. Continued back pressure on the driver will rotate the brake-actuator 8, so as to apply the brake to the hub and slow down or check its movement.

There is an intermediate position between the forward driving position and the braking position of the collar 11, at which the hub 7 is perfectly free to revolve in either direction on bearings 9 and 10. This position is taken automatically by the sleeve 11 when the forward rotation of the driver 2 has ceased and before back pressure is applied.

In the particular form shown 16 is a spring, and 17 is a slotted member, which may be referred to herein as a "cup-shaped" member, although its shape of course is immaterial to the invention. The free end of the slotted member 17 bears against the brake-actuator 8, and, as shown, a shoulder 20 is formed on the brake-actuator, against which the end of the member 17 presses. 18 is the slot in said member 17, and into this slot a pin 19 on the collar 11 always projects. The spring 16 is suitably secured to the member 17, and its free end bears against the end of the driver extension 3. It is by this means that the member 17 is held against the brake-actuator.

From the foregoing it will be seen that the collar 11 may slide longitudinally relatively to the axis of rotation of the hub without moving the slotted member 17. It will also be apparent that should collar 11 revolve it will carry with it the slotted member 17, since, as before stated, pin 19 projects into the slot therein at all times.

In Fig. 1 the parts are shown coupled together in such a manner that power is applied through the driver 2 to the hub, since the teeth 12 are in direct engagement with the teeth 13. The moment the application of power through the driver 2 ceases the hub 7 will continue to advance and will of course revolve the collar 11, which by reason of its engagement with the now stationary cam extension 3 will move to the left until the teeth 12 are freed from the hub. In this position the teeth on the collar do not engage with either the hub or the brake-actuator, and were it not for the presence of the slotted member, which is now frictionally held against rotation between the now stationary driver extension 3 and the stationary brack-actuator 8, the collar might rattle about, so as to cause its teeth to effect a loose engagement with the teeth on either the hub or the brake-actuator and produce a chattering noise. This, however, is entirely prevented by the presence of the slotted member, which provides just enough resistance to hold the collar 11 in an idle position. Now if it is desired to apply the brake the direction of the driver is reversed, and the cam extension 3 forces the collar 11 to the left into engagement with the teeth on the brake-actuator, the slot in the member 17 permitting sufficient independent longitudinal movement of said collar relatively to said member 17 to effect this engagement of the collar with the brake-actuator.

It should be noted that at all times the end of the member 17 bears lightly against the brake-actuator, and this frictional engagement is sufficient to hold the same slightly and afford sufficient resistance or drag to insure the quick action of the collar through the medium of the pin in the slot. Were it not for the presence of this pin-and-slot connection, the collar 11 might not respond to the action of the cam extension 3 quickly enough to secure an immediate coaction between said collar and the brake-actuator. By its presence, however, a reversal of the driver 2 instantly effects the shifting of the collar 11 and an engagement between the same and the brake-actuator. It will thus be seen that the slotted member 17 performs two useful functions—first, it so holds the collar in the idle position that all chattering of the parts is prevented, and, second, it insures the quick response of the collar to the forward rotation of the driver, so that it will shift into engagement with the hub the moment the rider desires to couple the driver with the wheel to apply a forward pressure.

From the foregoing it will be seen that the reversing of rotation of the driver will effect an engagement between the driver and the brake-actuator, so that the latter may move to apply the brake. Advancing the driver will result in the retraction of the brakes, the freeing of the collar from the brake-actuator, and the positive connection of the collar with the hub. All of these actions and connections are positive and eliminate the possibility of slip or failure to act.

21 is a sleeve-like bushing which is slipped over the axle 1, adjacent to the ends of the driver extension 3 and the brake-actuator 8, in such a manner that it serves to prevent wear upon the axle 1, the wear being all taken by said sleeve.

What I claim is—

1. A coaster-brake including a driver, an extension therefrom, a brake-actuator, a hub, a rotatable and longitudinally-movable collar, a spring located between said driver extension and the brake-actuator and a sliding connection between said spring and said collar arranged to produce a drag on said collar, the said parts being constructed so that when said driver is rotated in a forward direction the collar will be coupled directly with the hub and when said driver is reversed the collar will be thrown into engagement with said brake-actuator.

2. A coaster-brake including a driver, a brake-actuator, a hub, a collar, teeth carried by said brake-actuator and said collar and oppositely positioned, teeth carried by said hub and said collar, said teeth being formed on tapered portions thereof and extending longitudinally thereof, said driver being adapted to rotate the said collar and to bring its respective sets of teeth into engagement with the hub-teeth, or the brake-actuator teeth, depending upon the direction of rotation of the driver.

3. A coaster-brake including a driver, a brake-actuator, a hub, a collar adapted to coact with either said hub or said brake-actuator depending upon the rotation of the driver, a spring and frictional member coacting between the collar and driver extension to assist in the longitudinal movement of said collar.

4. A coaster-brake including a driver having a cam-threaded extension, a brake-actuator having teeth in the form of a crown-ratchet, a hub having one portion of its internal wall tapered, teeth on said tapered portion a collar mounted within said hub and having one set of teeth to correspond with the teeth on the brake-actuator and another set of teeth to correspond with the teeth in the hub and having a cam-threaded portion to correspond with the driver extension whereby the driver may be coupled positively through the collar either with the brake-actuator or the hub depending upon the direction of rotation of the driver.

5. A coaster-brake including a driver, a brake-actuator, a hub, a collar adapted to engage the brake-actuator or the hub depending upon the direction of rotation of the driver, and a spring-pressed cup-shaped member coacting with said collar adapted to give it sufficient drag when the direction of rotation of the driver is reversed to cause said collar to be moved longitudinally with respect to the driver.

6. A coaster-brake including a driver, a brake-actuator, a hub, a collar adapted to coact with the brake-actuator or the hub depending upon the direction of rotation of the driver, a cup-like member coacting with said collar, and a spring coacting with the member and an extension from the driver to assist in the longitudinal movement of the collar when the driver is reversed.

7. A coaster-brake including a driver, a brake-actuator, a hub, a rotatable and longitudinally-movable collar, teeth carried by said collar and teeth corresponding therewith carried by said hub whereby the driver may be coupled directly with the hub through said collar, the teeth to engage said collar and hub being tapered and arranged longitudinally to secure a wedging action and a positive action.

8. A coaster-brake including a driver, a brake-actuator, a hub, a rotatable and longitudinally-movable collar having a tapered portion, teeth carried by said collar on said tapered portion and extending longitudinally thereof and teeth corresponding therewith carried by said hub whereby the driver may be coupled directly with the hub through said collar, and a member coacting with said collar to assist in effecting the longitudinal movement of said collar.

9. A coaster-brake including a driver, a brake-actuator, a hub, a collar adapted to coact with said brake-actuator, a series of flaring teeth on the interior of said hub, a series of teeth carried by said collar on the end adjacent the brake-actuator, and a second series of teeth thereon adapted to engage the teeth in the hub, said driver being adapted to rotate the collar, said collar being arranged to engage the hub or the brake-actuator depending upon its direction of rotation of the driver.

10. A coaster-brake including a driver, a brake-actuator, a hub, a collar adapted to coact with the brake-actuator, a series of flaring teeth arranged on the interior of the hub, a similar series of teeth carried by the collar, the diameter of the body of the collar being less than the inner diameter of the teeth in the hub, said driver being adapted to rotate the collar and to move it longitudinally depending upon its direction of rotation.

11. A coaster-brake including a driver, a brake-actuator, a hub, a collar adapted to coact with the brake-actuator, a series of flaring teeth carried by the interior of the hub, a similar series of teeth carried by the collar, the lines of contact of said teeth being substantially in the form of a truncated cone, said driver being adapted to rotate the collar and to move it longitudinally depending upon its direction of rotation.

12. A coaster-brake including a driver, a brake-actuator, a hub, a collar adapted to coact with the brake-actuator, a series of flaring teeth carried by the interior of the hub, a similar series of teeth carried by the collar, the lines of contact of said teeth being substantially in the form of a truncated cone, said driver being adapted to rotate the collar and to move it longitudinally depending upon its direction of rotation, and a member coacting with the collar adapted to resist its rotative movement sufficiently to assist in insuring its longitudinal movement when the direction of rotation of the driver is reversed.

13. In a coaster-brake, a driver, an extension therefrom, a brake-actuator, a hub, a coupling device carried by the driver extension, means for engaging said coupling device with either the hub or the brake-actuator, an intermediate idle position for said coupling device and a device arranged between the said coupling device and the driver extension and frictionally holding said coupling device in said idle position and out of engagement with both the hub and the brake-actuator; said device also operating to apply a frictional drag on said coupling member to cause it to quickly respond to the advance rotation of the driver to shift it into contact with the hub and to thereby effect a positive connection between said driver and said hub.

Signed at New Britain, Connecticut, this 16th day of February, 1903.

CHARLES GLOVER.

Witnesses:
LAUREN M. BANCROFT,
CHARLES H. PARSONS.